US005717203A

United States Patent [19]

Yung

[11] Patent Number: 5,717,203

[45] Date of Patent: Feb. 10, 1998

[54] INFRARED MOTION DETECTOR WITH 180 ° DETECTING RANGE

[76] Inventor: Simon K. C. Yung, 6 Purves Road, Jardine's Lookout, Hong Kong

[21] Appl. No.: 800,302

[22] Filed: Feb. 18, 1997

Related U.S. Application Data

[63] Continuation of Ser. No. 346,049, Nov. 29, 1994, abandoned.

[51] Int. Cl.$^6$ .............................. G08B 13/18; G01J 5/08

[52] U.S. Cl. ...................... 250/221; 250/222.1; 250/353; 340/567

[58] Field of Search ................................ 250/221, 222.1, 250/239, 342, 353, 203.1; 340/555, 556, 557, 565, 567

[56] References Cited

U.S. PATENT DOCUMENTS

| | | | |
|---|---|---|---|
| 4,644,147 | 2/1987 | Zublin | 250/221 |
| 4,703,171 | 10/1987 | Kahl et al. | 250/221 |
| 4,873,469 | 10/1989 | Young et al. | 315/155 |
| 4,982,176 | 1/1991 | Schwarz . | |
| 5,015,994 | 5/1991 | Hoberman et al. | 340/567 |
| 5,101,194 | 3/1992 | Sheffer | 340/567 |
| 5,103,346 | 4/1992 | Chang . | |
| 5,124,546 | 6/1992 | Hu | 250/216 |
| 5,308,985 | 5/1994 | Lee | 250/353 |
| 5,386,210 | 1/1995 | Lee | 340/567 |
| 5,393,978 | 2/1995 | Schwarz | 250/353 |

OTHER PUBLICATIONS

PCT International Search Report dated Apr. 22, 1996, for International Application No. PCT/IB95/01127.

*Primary Examiner*—Stephone Allen

*Attorney, Agent, or Firm*—Majestic, Parsons, Siebert & Hsue

[57] ABSTRACT

A detector assembly for giving an infrared sensor a detecting range of about 180° includes a semi-cylindrical focusing lens and a pair of reflective mirror surfaces which is positioned behind the lens and oriented symmetrically with respect to each other with respect to a central symmetry plane and tilted with respect to both the axial direction of the semi-cylindrical lens and the symmetry plane such that infrared signals passing through the lens at azimuthal angles of incidence up to about 90° from the symmetry plane and impinging on either of the reflective surfaces will be received by the sensor. When the sensor thus detects the presence of an infrared-emitting source, a detection signal is outputted and power from a rechargeable battery is transmitted first at a higher voltage for a specified period of time and then at a lower voltage to a fluorescent tube through a contact piece being pressed against the tube. The contact piece is surrounded and supported by an electrical insulator which, in turn, is surrounded and supported by a socket member made of a thermally conductive material and provided with a planar protrusion which can be attached to a housing structure such that heat can be effectively conducted away from the contact piece.

20 Claims, 4 Drawing Sheets

INFRARED MOTION DETECTOR WITH 180 ° DETECTING RANGE

This is a continuation of application Ser. No. 08/346,049, filed Nov. 29, 1994, now abandoned.

BACKGROUND OF THE INVENTION

This invention relates to an infrared motion detector with a detecting range of about 180°. This invention relates also to an energy-efficient solar lamp which can be activated by such a detector.

Motion detectors with a passive infrared (PIR) sensor for temperature sensing and illumination control have been in use for burglar alarms and other kinds of monitoring systems. The detecting angle of prior art detectors of this kind is usually no greater than 120°. In other words, the detection capability of prior art motion detectors was severely limited. U.S. Pat. No. 5,103,346 issued to Chang disclosed an attempt to increase the detecting range for such a detector but the deflector element used for this purpose is a complicated structure having many reflective surfaces which are differently oriented.

It has also been known to combine such a motion detector with a fluorescent tube adapted to light up for a specified limited length of time when a moving object is detected by the motion detector. Such a combination is useful not only as a burglar alarm which will light up and thereby surprise an unsuspecting intruder whose motion has been detected, but also as an economical means for lighting, say, an outdoor path which needs to be lit up only when someone is passing. At a start-up time, however, a fluorescent tube requires a high voltage and draws a strong current momentarily, the required driving voltage dropping after a few seconds. This is not an economical way to use the energy stored in a battery which may be adapted to be recharged by solar cells.

Such a fluorescent tube usually draws energy through a contact piece pressed against it by an elastic means such as a spring. Such a contact piece tends to heat up during an actual operation, and this frequently has many undesirable effects such as the heating of the spring and other nearby components, adversely affecting the efficiency of the lighting system.

SUMMARY OF THE INVENTION

It is therefore a general object of the invention to provide an infrared motion detector with a detecting range of about 180°.

It is a more specific object of the invention to provide a system with a relatively simple structure, capable of providing a detecting range of about 180° to an infrared detector.

It is another object of the invention to provide such a detector adapted to light up a solar lamp when a moving object is detected thereby, using energy stored in a rechargeable battery economically.

It is still another object of the invention to provide such a detector with a solar lamp capable of effectively cooling its contact piece.

A detector system embodying the invention, with which the above and other objects can be accomplished, may be characterized as having an infrared sensor held inside a housing structure provided with a focusing lens and a deflector unit. The lens and the deflector unit are strategically designed and positioned with respect to each other and to the sensor such that infrared radiation impinging upon the system over a large range of azimuthal angle of incidence to pass through its lens can be deflected by the deflector unit and received by the sensor.

A solar lamp with a fluorescent tube according to this invention may be characterized as having a control circuit including a delay element such that energy stored in a rechargeable battery, which is recharged by solar cells, is used economically to provide a high voltage at start-up times of a discharge through the fluorescent tube. The contact piece pressed against the tube is supported through a ceramic insulator by a casing made of a heat-conductive material and having protruded parts through which it is affixed to the frame of the lighting system for efficient dissipation of heat.

BRIEF DESCRIPTION OF THE DRAWING

The accompanying drawings, which are incorporated in and form a part of this specification, illustrate embodiments of the invention and, together with the description, serve to explain the principles of the invention. In the drawings.

DETAILED DESCRIPTION OF THE INVENTION

Figure 1:
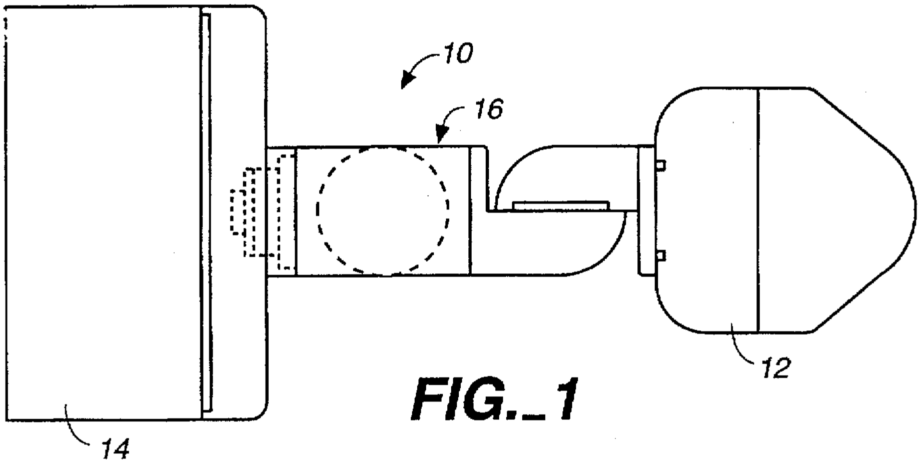
FIG. 1 is a top view of an infrared detector system embodying the invention.
Figure 2:
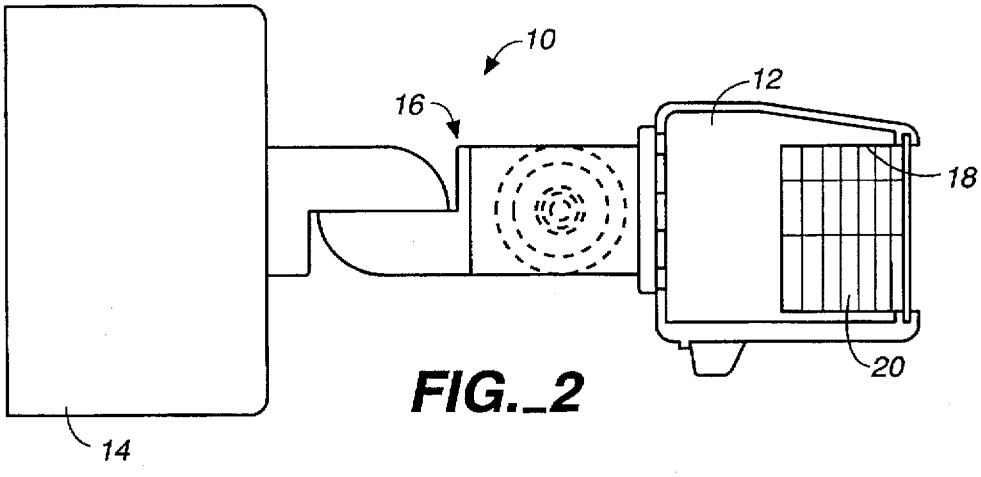
FIG. 2 is a side view of the detector system of FIG. 1.

As shown in FIGS. 1 and 2, an infrared detector assembly 10 according to a preferred embodiment of the invention has a housing structure 12 connected to a base 14 with an articulated arm system 16 such that its orientation can be adjusted even after the base 14 is attached to a fixture such as a wall or a ceiling. The housing structure 12 has a semicircular light-admitting opening 18 at its front part away from the base 14. A focusing lens 20 is disposed at this opening 18 such that infrared radiation from a source to be detected, impinging thereon, will be focused at a selected point inside the housing structure.

Figure 3:
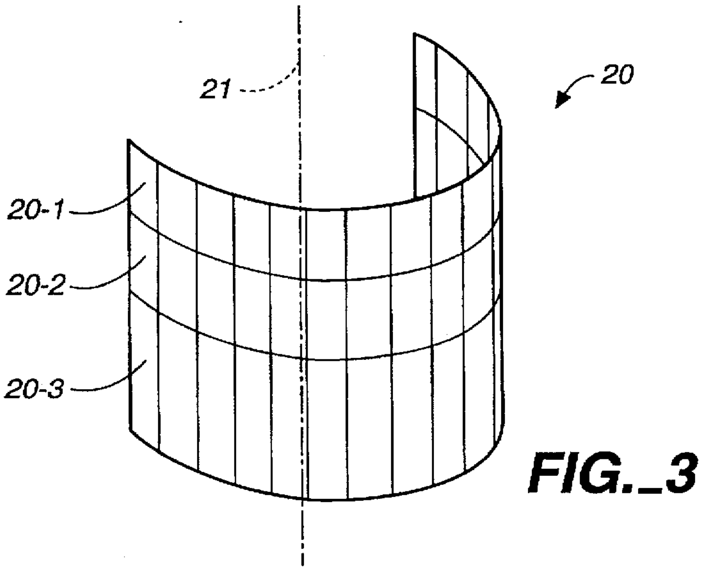
FIG. 3 is a schematic perspective view of the focusing lens.
Figure 4:
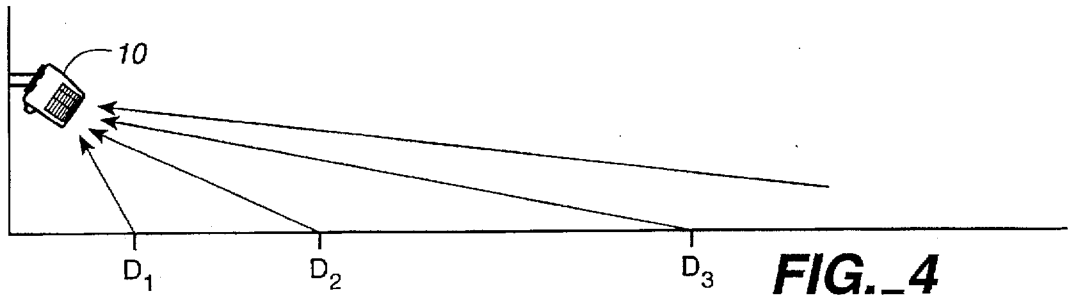
FIG. 4 is a schematic side view showing the relationship between the lens portions of the focusing lens of FIG. 3 and ranges of distances from sources to be detected therethrough.

As shown in FIG. 3, the focusing lens 20 is semi-cylindrical with its central axis indicated by numeral 21 for the purpose of reference. Such a lens has been known and may be made by bending a Fresnel lens made of a polyethylene sheet into a semi-cylindrical form. According to a preferred embodiment of the invention, as illustrated in FIG. 3, the sheet to be bent to form the focusing lens 20 is partitioned into three strip-like lens portions 20-1, 20-2 and 20-3 one on top of another which are bent together. The lens portions 20-1, 20-2 and 20-3 may be of the same or different widths (in the direction of the axis 21), each being adapted to receive and focus infrared signals from sources at distances within a difference range. This is schematically illustrated in FIG. 4 wherein the detector assembly 10 is set at a certain height and a somewhat downward orientation. One of the lens portions is adapted to detect infrared sources at horizontal radial distances in a first range between $D_1$ and $D_2$ from the detector assembly 10, another being for sources at distances in a second range between $D_2$ and $D_3$, and the third being for sources at distances in excess of $D_3$, where the distances $D_1$, $D_2$ and $D_3$ may be set, for example, equal to 3 m, 8 m, and 15 m, respectively.

Figure 5:
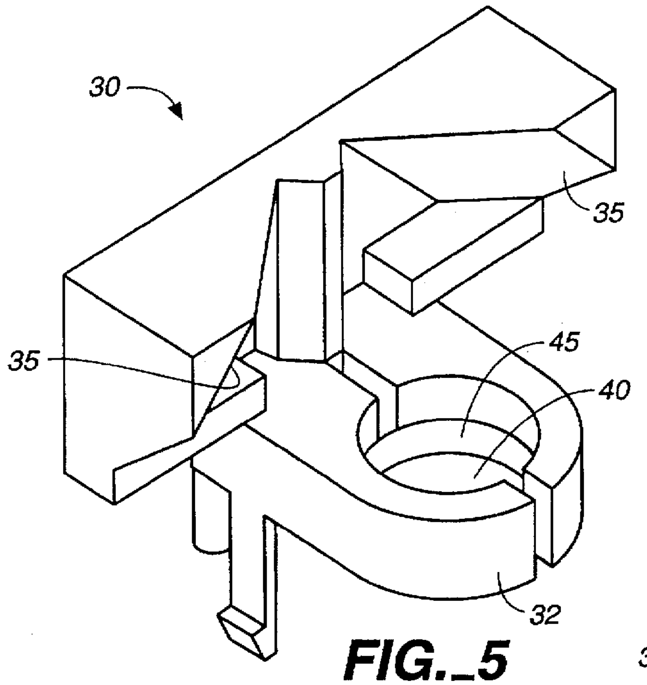
FIG. 5 is a perspective view of the deflector unit.
Figure 6:
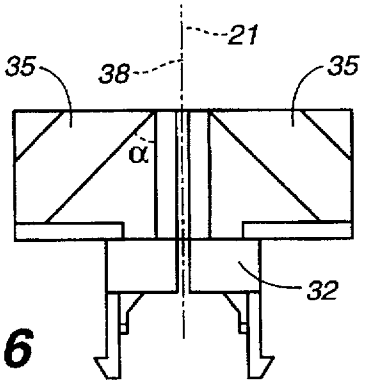
FIG. 6 is a front view of the deflector unit.
Figure 7:
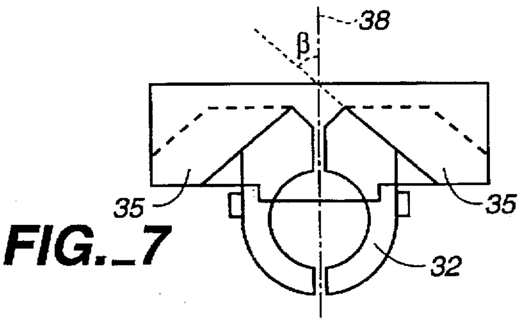
FIG. 7 is a top view of the deflector unit.

FIGS. 5, 6 and 7 show a deflector unit 30 disposed inside the housing structure 12 behind the focusing lens 20, with a sensor housing 32 and a pair of reflective surfaces 35 formed unistructurally and symmetrically with respect to an imaginary plane 38 (referred to as the symmetry plane) which includes the aforementioned central axis 21 of the semi-cylindrical focusing lens 20. The sensor housing 32 is annular, having a signal-receiving opening, and serves to thermally protect a passive infrared sensor 40 (such as produced by Nippon Ceramic) disposed in alignment with this signal-receiving opening so as to receive signals reflected by the reflective surfaces 35 and reaching it nearly parallel to the axis 21. For this reason, the unistructurally formed deflector unit 30 is made of a thermally insulative plastic material. A filter 45 disposed above the sensor 40 is adapted to pass therethrough only infrared signals with frequencies (or wavelengths) within a specified range. If the detector assembly 10 is used for a burglar alarm, for example, infrared signal emitters other than humans are of no interest and, since the range of infrared frequencies emitted by humans is known, use is made of a filter which permits only infrared signals in this range to pass through.

The reflective surfaces 35 are mirror surfaces facing each other obliquely, each tilted so as not to be either parallel or perpendicular to either the axis 21 or the symmetry plane 38. They are tilted in such a way that infrared signals emitted from a source (of the size of a human if the application is to a burglar alarm) within a desired range of area and entering the detector through the focusing lens 20 will be at least in part reflected by either of the reflective surfaces 35 and received by the sensor 40, where the desired range of area extends azimuthally to about 90° in both directions from the symmetry plane 38. A detection range of about 180° can thus be obtained.

As shown in FIGS. 6 and 7, each of the reflective surfaces 35 of the deflector unit 30 according to the illustrated embodiment crosses a plane perpendicular to the axis 21 to form a line making an angle $\beta$ of about 50° with the symmetry plane 28 and a plane perpendicular to the symmetry plane 38 and parallel to the axis 21 to form a line making an angle $\alpha$ of about 45°. In other words, normal lines to these reflective surfaces 35 make an angle approximately equal to $\arctan\{(\tan\alpha)(\cos\beta)\}$, or about 33° with the axis 21.

Figure 8:
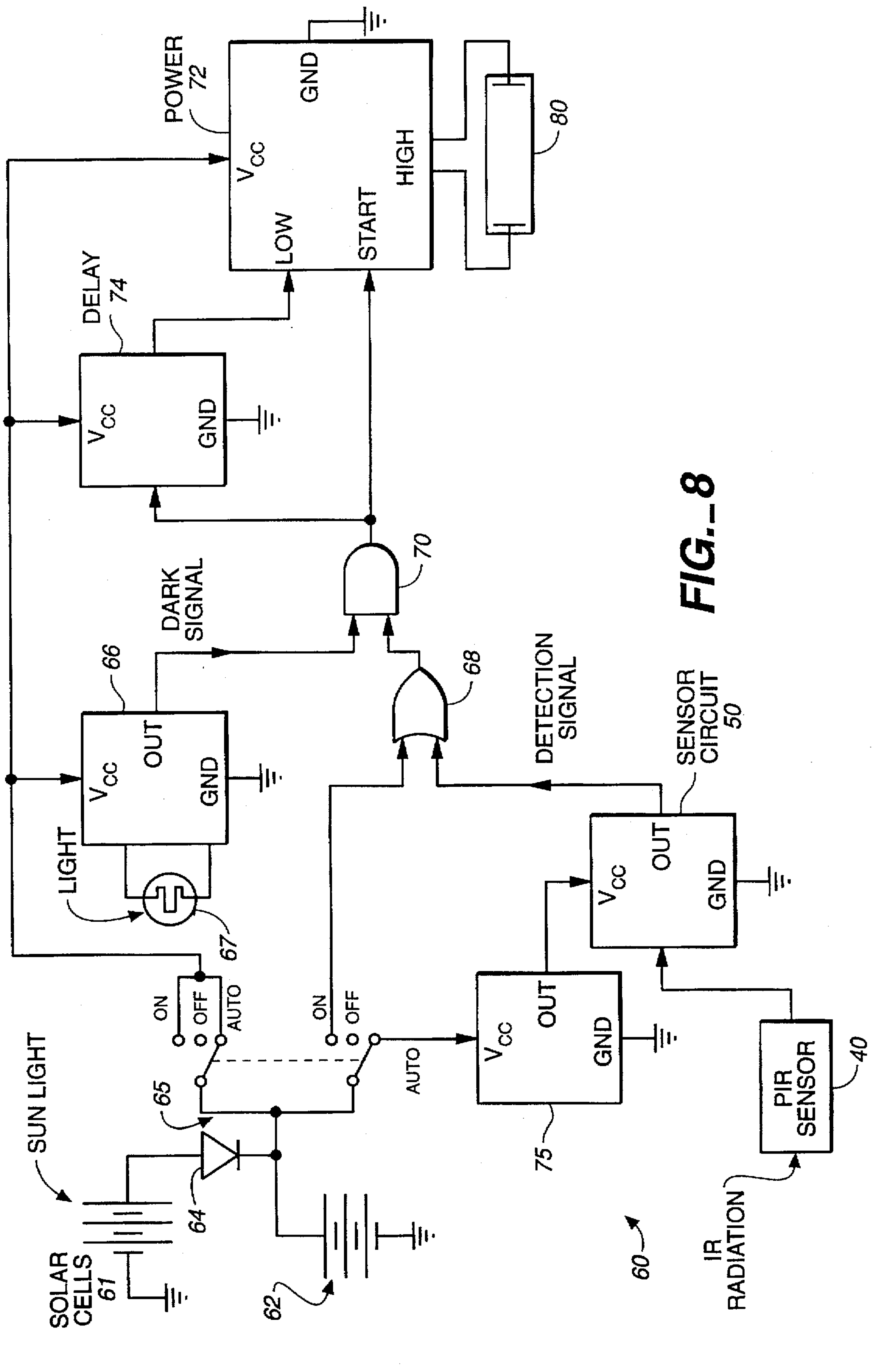
FIG. 8 is a block diagram of a solar lamp embodying the invention, adapted to be connected to an infrared detector system such as the one shown in FIG. 1.

As explained above, the sensor 40 is adapted to receive infrared radiation with frequencies in a selected range and thereby detect motion of a targeted radiation source such as a human. As shown in FIG. 8, the sensor 40 is generally connected to a sensor circuit 50, of which the function is to output a detection signal whenever the sensor 40 "detects" the presence of a targeted radiation source in motion. The outputted detection signal may be transmitted to any warning device such as an alarm-sounding device. FIG. 8 is a schematic block diagram of a solar lamp 60 according to a preferred embodiment of the present invention including a fluorescent tube 80 with brightness, say, of 9000 LUX which is adapted to light up in response to a detection signal from the sensor circuit 50. It now goes without saying that such a lamp can be used not only as a burglar alarm but also as an automatically switched energy-saving lamp which lights up only when there is a moving person who may need light but automatically turns off the light as soon as such person is out of its sight. As will be explained below, the solar lamp 60 shown in FIG. 8 is additionally adapted to light up the fluorescent tube 80 automatically when it is dark, whether or not a moving person is in sight.

As shown in FIG. 8, the solar lamp 60 includes solar cells 61, such as single crystal solar cells with anti-reflective coating, and a rechargeable battery 62, such as a 6V, 1.2 Ah lead-acid battery, connected through a diode 64 for protecting the battery 62 from discharging through the charging circuit when external power supply is not connected. A three-way switch 65 can be in ON, OFF or AUTO position. When it is in the OFF position, the battery 62 is disconnected from the sensor circuit 50 and the fluorescent tube 80, but the rechargeable battery 62 can still be recharged by the solar cells 61.

The switch 65 is put in the ON position if it is desired to turn on the fluorescent tube 80 automatically when it is dark, independent of whether or not a moving person is being detected. For this purpose, the solar lamp 60 is provided with a light intensity circuit 66 which is adapted to receive energy from the rechargeable battery 62 and to output a darkness-indicating signal (DARK) when a light sensor 67 associated therewith detects that it is dark in its environment. The light sensor 67 is associated with an appropriate level detecting circuit (not shown) for detecting the battery level such that, once the battery level drops below a certain minimum threshold level such as 5.6V, the lighting of the tube 80 is disable so as to protect the battery 62 from over-discharging. Normal light operation of the tube 80 will resume only after the battery 62 returns to a normal operating level such as 6V. This threshold margin of about 0.4V–0.5V serves to eliminate flickering effects caused by voltage rippling when the tube 80 is being turned on and off.

Figure 9:
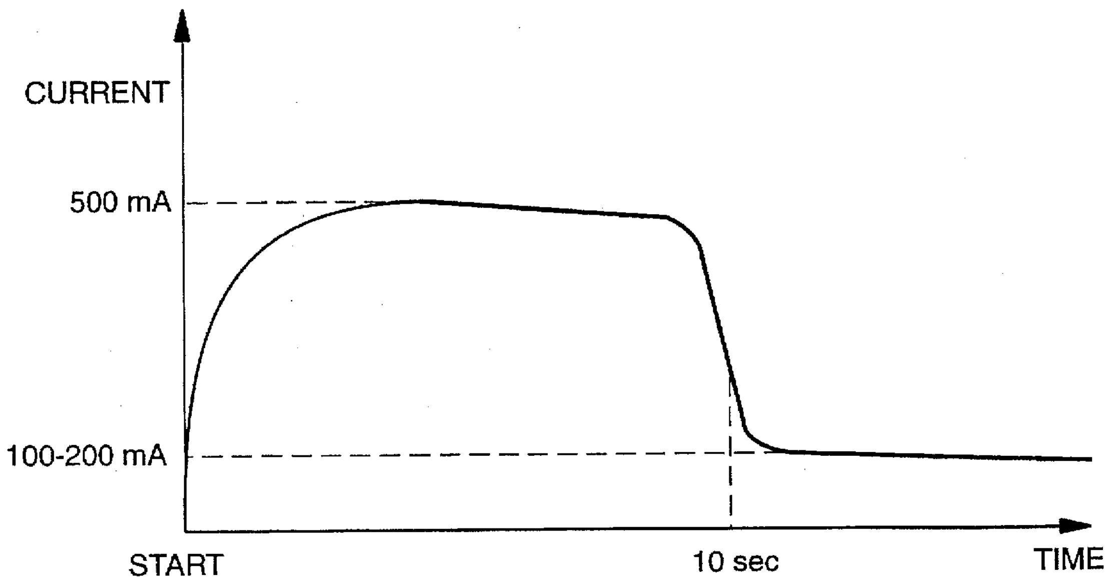
FIG. 9 is a schematic graph of the current through the fluorescent tube shown in FIG. 8 at the time of power start-up.

The darkness-indicating signal (DARK) is received by an AND gate 70 through one of its input terminals. Since the other input terminal of the AND gate is then receiving energy from the rechargeable battery 62 through an OR gate 68, the AND gate will be outputting a signal as long as it is dark where the light sensor 67 is. The outputted signal from the AND gate is in part transmitted directly to a power circuit causing a high voltage to be applied to the fluorescent tube 80 for 10 seconds, and in part transmitted to a delay circuit 74 for providing a delay of 10 seconds. Both the power circuit 72 and the delay circuit 74 are activated by energy from the rechargeable battery 62 when the switch 65 is in the ON position, and the delayed signal from the delay circuit 74 is received by the power circuit 72, causing a low voltage to be applied to the fluorescent tube 80. Thus, the current through the fluorescent tube 80, when the light intensity circuit 66 begins to transmit a DARK signal, is as shown in FIG. 9. As discussed above, this current profile serves to improve the working hour of the battery 62.

If the switch 65 is in the AUTO position, the voltage of the battery 62 is in part applied to a +4V DC regulator 75 which serves to activate the PIR sensor circuit 50. The regulator 75 is provided because the sensor circuit 50 is very sensitive to electrical noise and power ripples caused by turning on and off the tube 80. The regulator 75 is implemented to provide a stable power source for the sensor circuit 50. The highly sensitive sensor circuit 50 is capable of detecting human motion as far as 30 feet away and thereupon outputs a detection signal.

The detection signal is received by the AND gate 70 through the OR gate 68, while the voltage of the battery 62 is applied to the light intensity circuit 66, the power circuit 72 and the delay circuit 74, as when the switch 65 is in the ON position. Thus, the solar lamp 60 in this case operates to turn on the fluorescent tube 80 only when it is dark and a motion is detected by the sensor.

The power circuit 72 serves to enable a high current (500–600 mA) oscillation. Since the operating frequency is relatively high (30–100 KHz), a small transformer is sufficient for a few watt of power conversion. A tagged terminal (not shown) may also be provided from the output of the transformer to make it easier to start up the tube 80 with a small amount of filament current.

Figure 10A:
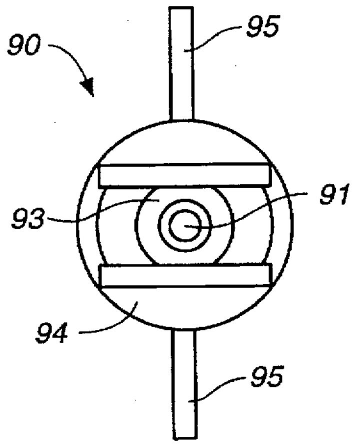
FIGS. 10A and 10B are respectively a front view and a partially sectional side view of a socket for the fluorescent tube shown in FIG. 8.
Figure 10B:
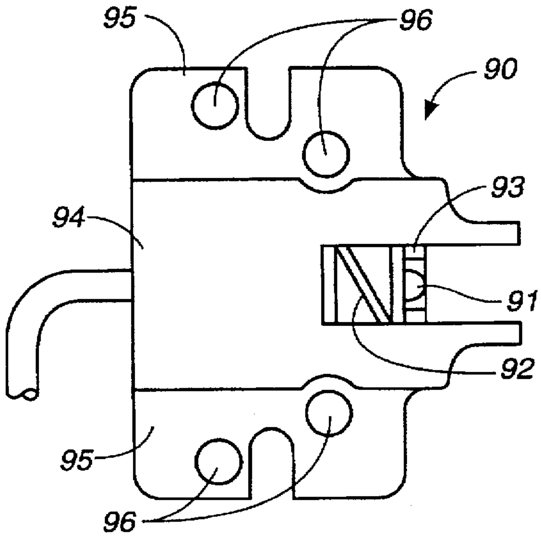

A socket for supporting the fluorescent tube 80 in the solar lamp 60 is shown at 90 in FIGS. 10A and 10B, having a metallic contact piece 91 adapted to be pressed against the fluorescent tube (not shown in FIGS. 10A and 10B) by means of a spring 92. As explained above, the contact piece 91 tends to heat up, adversely affecting the electrical contact as well as the lifetime of the lamp. For this reason, the socket 90 embodying this invention is characterized as having a ceramic electrical insulator 93 surrounding it inside a housing 94 made of a thermally conductive material such as aluminum or an aluminum alloy. The housing 94 is further provided with attachment plates 95 protruding therefrom like spread wings and having screw holes 96 therethrough. These attachment plates 95 are also made of the same thermally conductive material as the housing 94 and adapted to be fastened to a frame structure (not shown) of the solar lamp 60 by screws (not shown) passing through these holes 96 such that heat can be easily conducted away from the contact piece 91 through the thermally conductive attachment plates 95 to the frame structure of the solar lamp 60.

The invention has been described above with reference to only a limited number of examples, but the scope of the invention is not to be interpreted as being limited by these examples. It is to be understood that many variations and modifications are possible and included within the scope of the invention. For example, the number of strips into which the lens surface is partitioned is not limited to three, and the oblique angles of the reflective surfaces with respect to the axis 21 and the symmetry plane 28 may change, depending on their relative positions with respect to the sensor 40 as well as the focal length of the lens. The solar cells 61 and the fluorescent tube 80 may be contained inside a single housing structure, or they may be contained in two physically separate housing units which are electrically connected to each other. Such an housing may contain two detectors of the kind described above such that a detecting system with a total detecting range of 360° may be realized. The AND and OR gates shown in FIG. 8 are for easy understanding only. The actual gate functions may be simulated with a special configuration of transistors and diodes. The ON terminal of the switch 65 is not an essential component of the invention, but a battery charger (not shown) powered, say, with an external 12 Vdc power supply of maximum current rating higher than 500 mA, may be connected to the battery 62 for providing a steady 500 mA charging current to the lead-acid battery 62 and automatically stopping the charging when the battery 62 is fully charged. Such a circuit may include light-emitting diodes for indicating availability of external power supply and that a charging operation is in progress. In summary, the invention is intended to be interpreted broadly, and any modifications and variations on what has been disclosed above, which may be apparent to a person skilled in the art, are intended to be within the scope of the invention.

What is claimed is:

1. A detector assembly comprising:

a main housing having a front and a top, oriented with a front opening facing a front axis and three facing a polar axis orthogonal to the front axis, much that a coordinate origin given by an intersection of the front and polar axes resides inside said main housing;

a focusing lens at the front opening of said main housing, said focusing lens being semi-cylindrical and asimuthal around the polar axis and substantially symmetric about the front axis;

a sensor located at the origin and facing the polar axis such that the sensor sustains a field of view about the polar axis; and a deflector unit disposed behind said focusing lens and above said sensor for deflecting rays from said focusing lens from azimuthal directions into directions about the polar axis, said deflector unit having a pair of reflective surfaces adjacent to each other and disposed symmetrically with respect to the front axis, each of said pair of reflective surfaces being oblique to both said polar axis and said front axis wherein rays passing through said focusing lens at azimuthal angles of incidence up to about 90° from either side of the front axis and impinging on either of said reflective surfaces are deflected into the field of view of said sensor about the polar axis.

2. The detector assembly as in claim 1, wherein each of said pair of reflective surfaces is a plane mirror.

3. The detector assembly as in claim 1, wherein said sensor includes one that detects infrared rays.

4. The detector assembly of claim 1, wherein said focusing lens comprises a plurality of lens portions, each of said lens portions being semi-cylindrical and azimuthal around said polar axis and adapted to receive rays originating at distances in a different range from said detector assembly for redirection into said sensor.

5. The detector assembly of claim 1, wherein said focusing lens comprises a Fresnel lens made of a polyethylene sheet bent into a semi-circular shape.

6. The detector assembly of claim 1, further comprising a filter disposed between said reflective surfaces and said sensor for allowing only infrared rays within a specified frequency range to pass therethrough.

7. The detector assembly of claim 1, further comprising attaching means for adjustably attaching said main housing to a fixture in a selected orientation.

8. The detector assembly of claim 1, wherein lines normal to said reflective surfaces make an angle of about 33° witch said polar axis.

9. The detector assembly of claim 1, wherein said deflector unit has an annular sensor housing unistructurally formed therewith, said sensor being disposed inside said annular sensor housing.

10. The detector assembly of claim 9, wherein said annular sensor housing unistructurally formed with said deflector unit ensures automatic alignment of said sensor with respect to said deflector unit such that substantial portion of rays passing through said focusing lens and impinging on said deflector unit are received by said sensor.

11. The detector assembly of claim 1, further comprising:

a light emitting means for emitting light; and control means responsive to one of a plurality of predefined conditions for enabling said light emitting means.

12. The detector assembly of claim 11, further comprising means for detecting by said sensor the presence or absence of a moving object of a specified kind; and wherein said plurality of predefined conditions includes the detection of the presence of a moving object.

13. The detector assembly of claim 11, further comprising means for detecting whether rays detected by said sensor have a detected intensity below or above a predetermined threshold; and wherein said plurality of predefined conditions includes the detection of said detected intensity below said predetermined threshold.

14. The detector assembly of claim 11, further comprising:

means for detecting by said sensor the presence or absence of a moving object of a specified kind;

means for detecting whether rays detected by said sensor have an intensity below or above a predetermined threshold; and wherein said plurality of predefined conditions includes both the detection of the presence of a moving object and the detection of said detected intensity below said predetermined threshold.

15. The detector assembly of claim 11, further comprising:

a power source for supplying first and second voltages, said first voltage being greater than said second voltage; and wherein said control means includes means for enabling supply of said first voltage to said light emitting means for a predetermined time followed by supply of said second voltage to said light emitting means.

16. The detector assembly of claim 15, wherein the predetermined time is timed by a delay circuit.

17. The detector assembly of claim 11, further comprising:

a power source for supplying a voltage for powering said light emitting means;

means for detecting whether the voltage is above or below a predetermined threshold voltage; and wherein said plurality of predefined conditions includes the detection of the voltage from said power source above said predetermined threshold voltage.

18. The detector assembly of claim 11, wherein said light emitting means includes:

a light emitting tube;

a socket member of a thermally conductive material for receiving said light emitting tube;

an electrically conductive contact piece supported in said socket member and adapted to be in electrical contact with said light emitting tube for transmitting power therethrough from a power source to said light emitting tube;

said electrically conductive contact piece being electrically insulated from said socket member while in thermal conduction with said socket member, thereby allowing heat from said contact piece to be effectively dissipated via said socket member.

19. The detector assembly of claim 18, wherein said socket member is constituted from materials that include aluminum or an aluminum alloy.

20. The detector assembly of claim 18, wherein said socket member further comprises cooling fins.

* * * * *